(12) United States Patent
Yeh

(10) Patent No.: US 7,364,105 B1
(45) Date of Patent: Apr. 29, 2008

(54) FISHING REEL WITH A WARNING DEVICE

(76) Inventor: Shih-Yuan Yeh, No.206, Chen-Fu Rd., Tai-Ping City, Taichung Hsien (TW)

( * ) Notice: Subject to any disclaimer, the term of this patent is extended or adjusted under 35 U.S.C. 154(b) by 0 days.

(21) Appl. No.: 11/830,584

(22) Filed: Jul. 30, 2007

(51) Int. Cl.
  *A01K 89/01* (2006.01)
(52) U.S. Cl. .................. 242/305; 242/223; 242/322
(58) Field of Classification Search ............. 242/223, 242/305, 322
  See application file for complete search history.

(56) References Cited

U.S. PATENT DOCUMENTS

| | | | | |
|---|---|---|---|---|
| 4,402,470 A | * | 9/1983 | Hamayasu | 242/286 |
| 4,650,161 A | * | 3/1987 | Kaneko | 242/224 |
| 5,199,665 A | * | 4/1993 | Tipton | 242/305 |
| 5,524,831 A | * | 6/1996 | Carlson | 242/223 |
| 6,412,722 B1 | * | 7/2002 | Kreuser et al. | 242/288 |
| 6,433,703 B1 | * | 8/2002 | Tucker | 340/815.51 |
| 6,594,942 B1 | * | 7/2003 | Sherwood et al. | 43/17.5 |
| 6,973,999 B2 | * | 12/2005 | Ikuta et al. | 188/161 |

\* cited by examiner

*Primary Examiner*—Emmanuel M Marcelo
(74) *Attorney, Agent, or Firm*—patenttm.us

(57) ABSTRACT

A fishing reel has a body, a spool, a handle and a warning device. The body has a spool axle rotatably mounted in the body. The spool is rotatably and coaxially mounted around the spool axle of the body. The handle is rotatably mounted on the body and is connected to the spool. The warning device is mounted between the spool and the spool axle and has at least one illuminating element, an annular coil and an annular permanent magnet. Each illuminating element is mounted through the spool. The annular coil is coaxially mounted in the spool and is electrically connected to each illuminating element. The annular permanent magnet is coaxially mounted around the spool axle, corresponds to the coil and is separated from the coil by a gap.

4 Claims, 6 Drawing Sheets

FISHING REEL WITH A WARNING DEVICE

BACKGROUND OF THE INVENTION

1. Field of the Invention

The present invention relates to a fishing reel, and more particularly to a fishing reel with a warning device to illuminate when a fishing line is pulled.

2. Description of Related Art

Fishing reels are used in conjunction with fishing rods and each has a fishing line reeled around the reel. A conventional fishing reel comprises a body, a spool and a handle. The spool is rotatably mounted on the body, and a fishing line is reeled around the spool. The handle is rotatably attached to the body and is connected to the spool with a transmission, such that the spool is driven by the handle to rotate or move relative to the body.

However, when a fish is hooked causing the fishing line to be pulled, the conventional fishing reel does not have any warning effect. In particular, when a person is fishing in a dark environment, for example at night, the person cannot clearly recognize whether the fishing line is pulled. A conventional technique it to hang a bell near a tip of the fishing rod to sound a warning, but false alarms occur when wind blows over the bell, therefore the person cannot reliably recognize when a fish is hook.

To overcome the shortcomings, the present invention tends to provide a fishing reel to mitigate or obviate the aforementioned problems.

SUMMARY OF THE INVENTION

The main objective of the invention is to provide a fishing reel having a warning device to provide an illuminating signal when a fishing line is pulled. The fishing reel has a body, a spool, a handle and a warning device. The body has a spool axle rotatably mounted in the body. The spool is rotatably and coaxially mounted around the spool axle of the body. The handle is rotatably mounted on the body and is connected to the spool. The warning device is mounted between the spool and the spool axle and has at least one illuminating element, an annular coil and an annular permanent magnet. The at least one illuminating element is mounted through the spool. The annular coil is coaxially mounted in the spool and is electrically connected to each illuminating element. The annular permanent magnet is coaxially mounted around the spool axle, corresponds to the coil and is separated from the coil by a gap.

Other objects, advantages and novel features of the invention will become more apparent from the following detailed description when taken in conjunction with the accompanying drawings.

DETAILED DESCRIPTION OF PREFERRED EMBODIMENT

Figure 1:
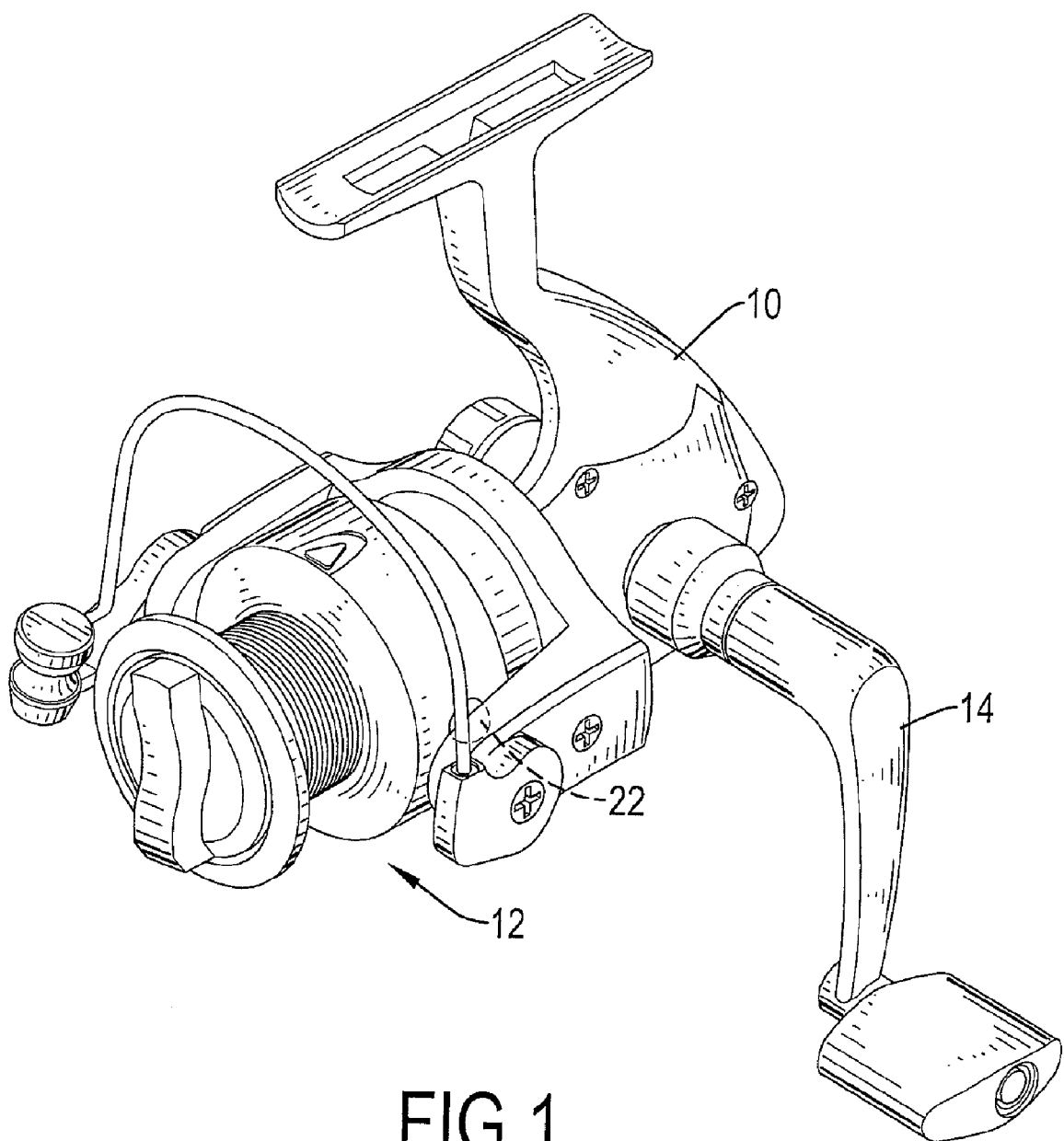
FIG. 1 is a perspective view of a first embodiment of a fishing reel with a warning device in accordance with the present invention.
Figure 2:
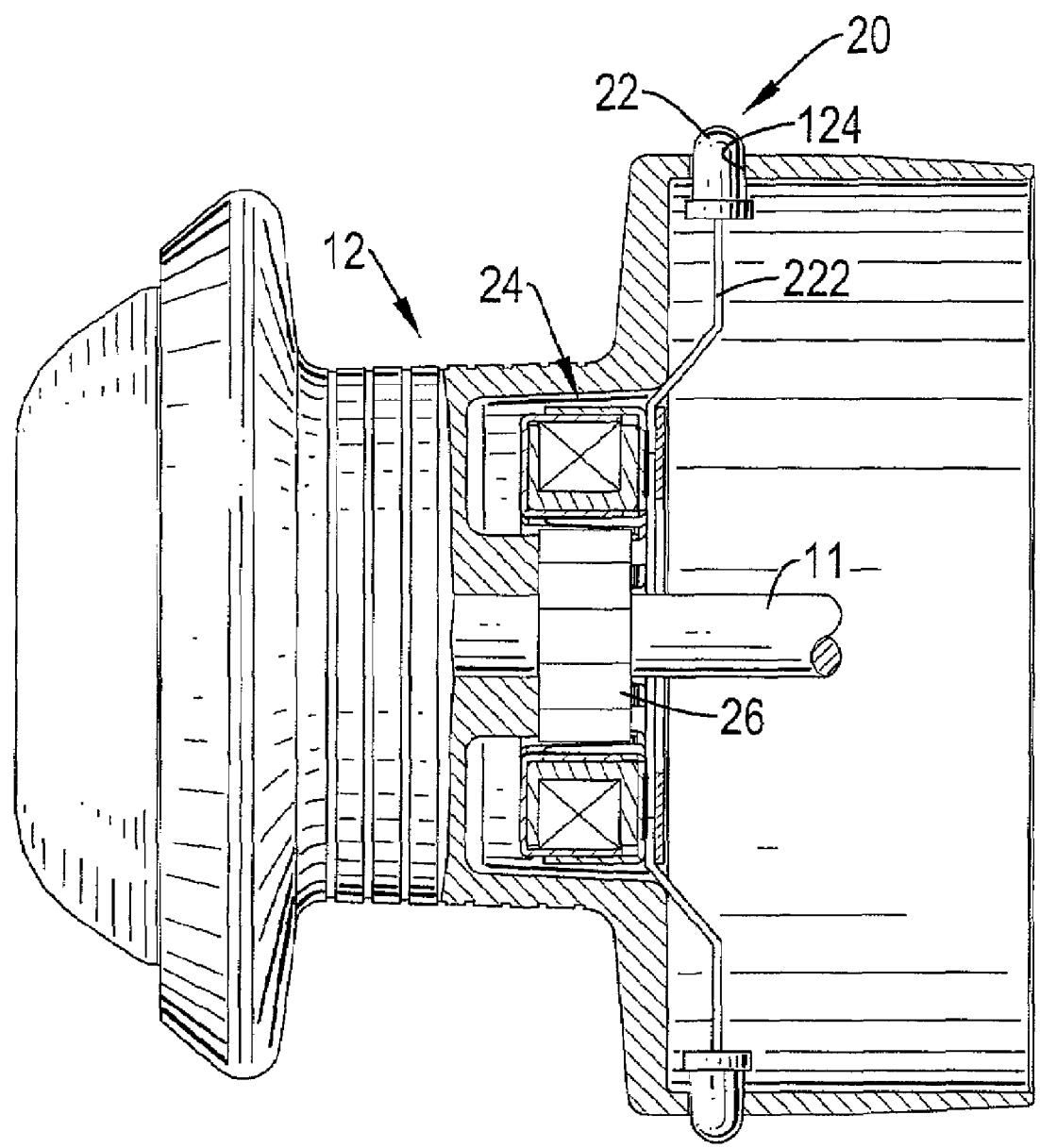
FIG. 2 is a side view in partial section of a spool with the warning device of the fishing reel in FIG. 1.

With reference to FIGS. 1, 2, 5 and 6, a fishing reel in accordance with the present invention comprises a body (10), a spool (12,12A,12B), a handle (14) and a warning device (20).

The body (10) has a spool axle (11) rotatably mounted in the body (10).

The spool (12,12A,12B) is rotatably and coaxially mounted around the spool axle (11) of the body (10), is used to wind a fishing line around and may have a center and a recess (122). The recess (122) is defined around the center of the spool (12).

The handle (14) is rotatably mounted on the body (10) and is connected to the spool (12,12A,12B) to drive the spool (12,12A,12B) to rotate or move relative to the body (10) when the handle (14) is rotated. The structure of and the connection between the body (10), the spool (12,12A,12B) and the handle (14) may be conventional, and further description of these elements is omitted.

Figure 3:
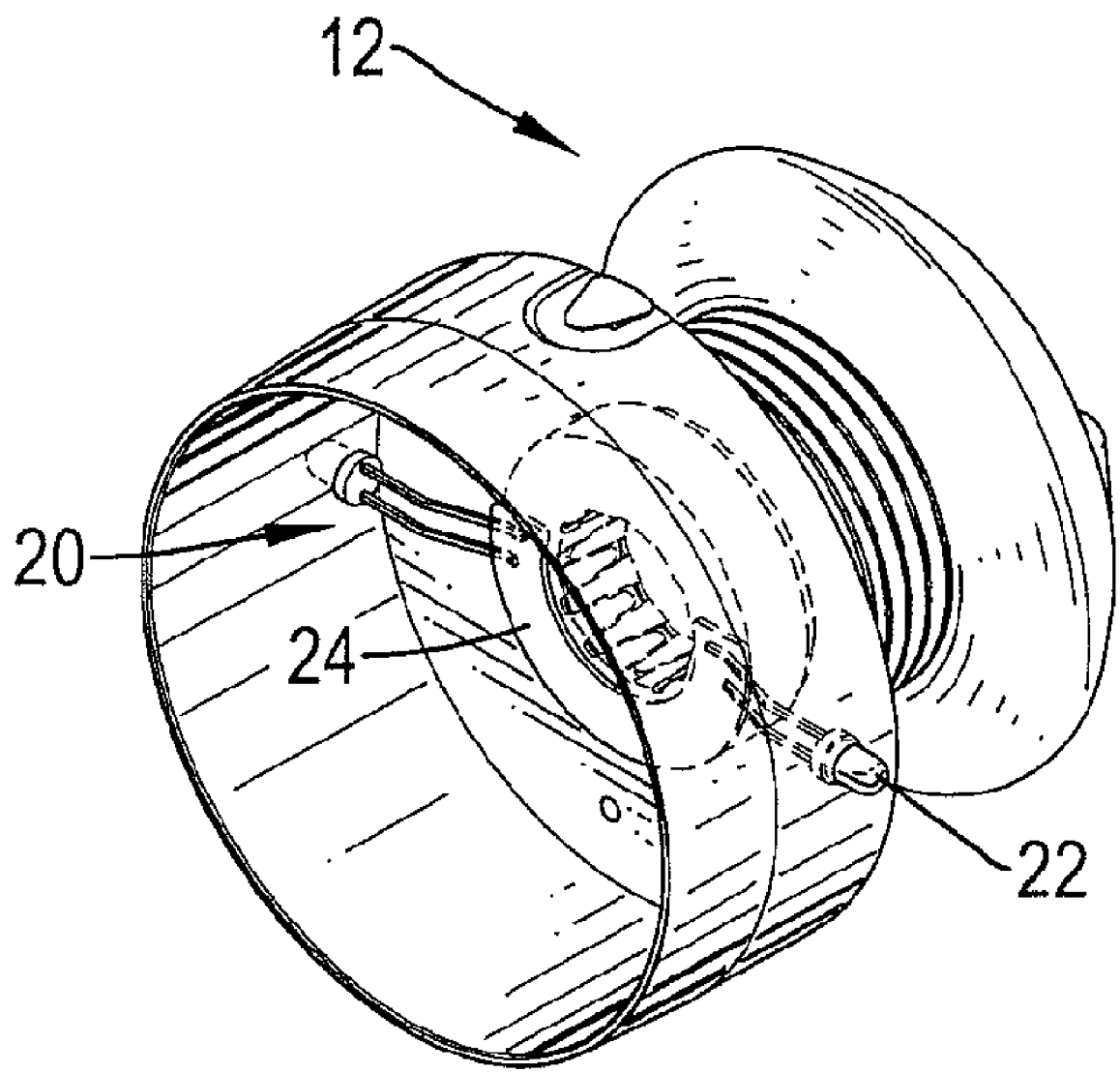
FIG. 3 is a perspective view of the spool with the warning device of the fishing reel in FIG. 1.
Figure 4:
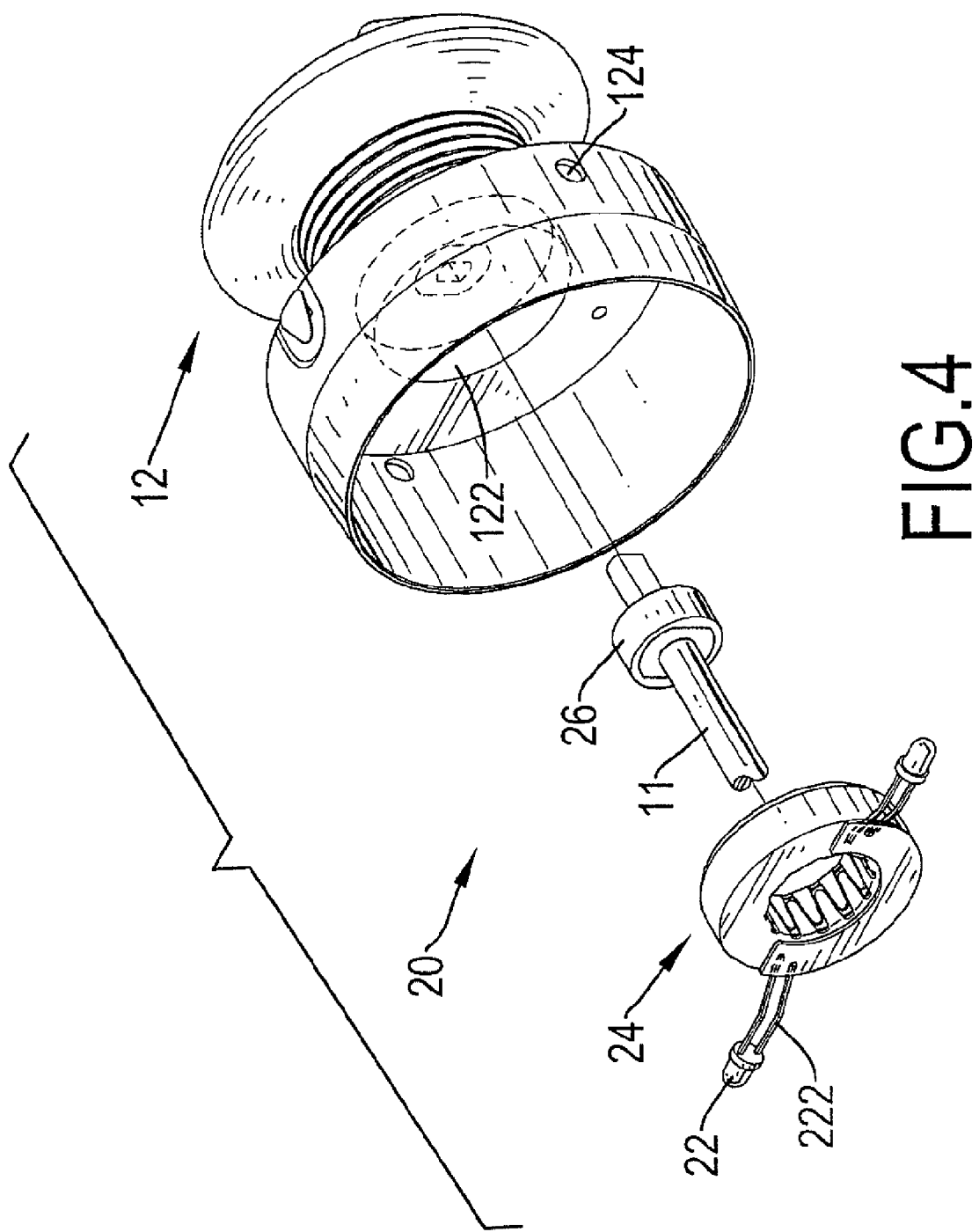
FIG. 4 is an exploded perspective view of the spool with the warning device of the fishing reel in FIG. 1.

With further reference to FIGS. 3 and 4, a warning device (20) is mounted between the spool (12) and the spool axle (11) and comprises at least one illuminating element (22), an annular coil (24) and an annular permanent magnet (26). The at least one illuminating element (22) is mounted through the spool (12). In a preferred embodiment, the warning device (20) has two illuminating elements (22), and each illuminating element (22) is a light emitting diode (LED) and has two legs (222).

The annular coil (24) is coaxially mounted in the spool (12), may be mounted in the recess (122) and is electrically connected to each illuminating element (22). The annular coil (24) has two ends connected respectively with the legs (222) of each illuminating element (22).

The annular permanent magnet (26) is coaxially mounted around the spool axle (11) corresponds to the coil (24) and is separated from the coil (24) by a gap.

In such an arrangement, when a fish is hooked and the fishing line forces the spool (12) to rotate, the coil (24) rotates synchronously with the spool (12) and cuts through the magnetic line of the permanent magnet (26) to generate current in the coil (24). Accordingly, the illuminating elements (24) are lit, and a visible warning is provided while the spool (12) is rotating. Especially in a dark environment, the light from the illuminating elements (22) can provide a clear warning effect to allow the person to recognize when the fishing line is being pulled by an external force.

Figure 5:
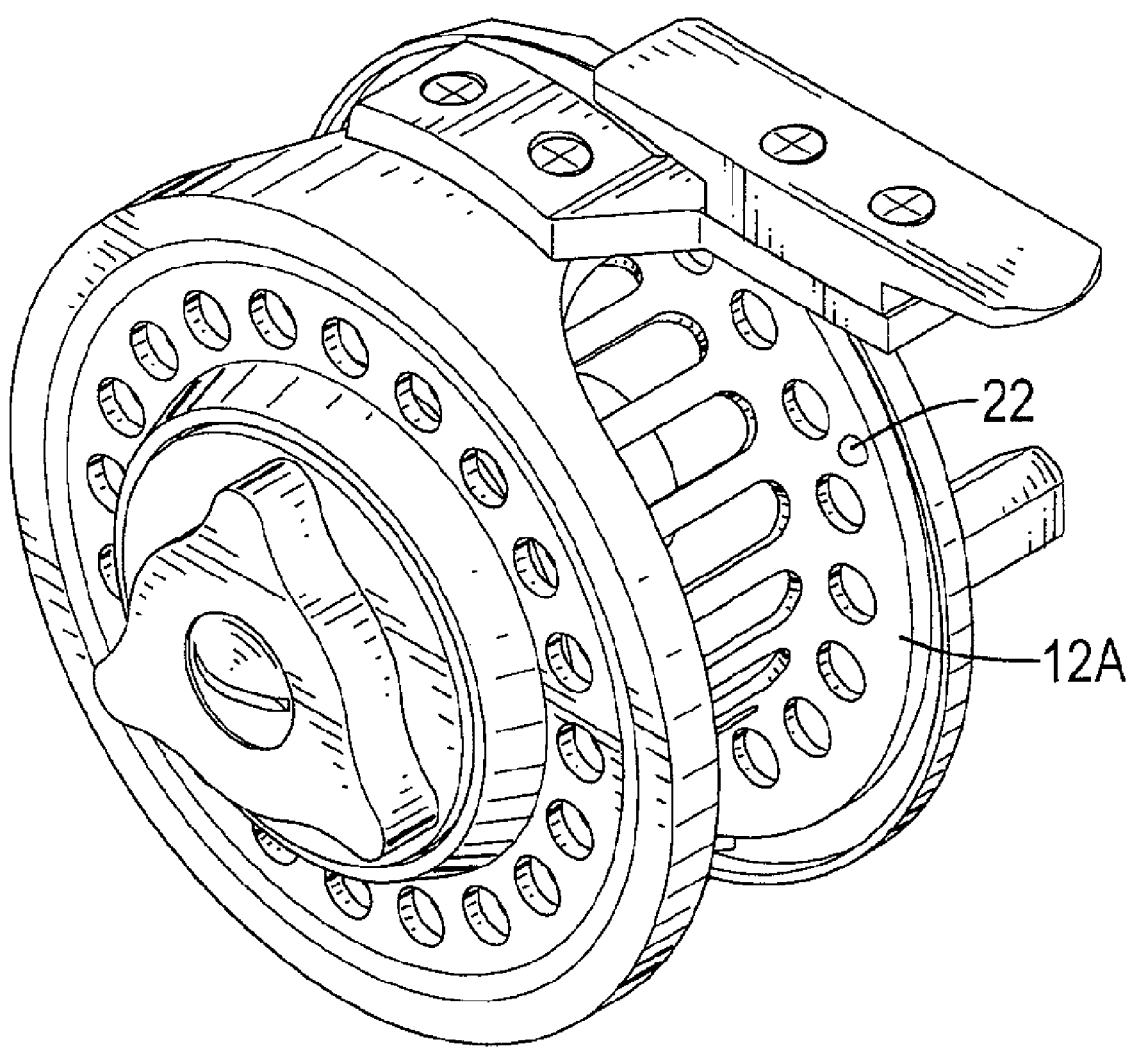
FIG. 5 is a perspective view of a second embodiment of a fishing reel with a warning device in accordance with the present invention.
Figure 6:
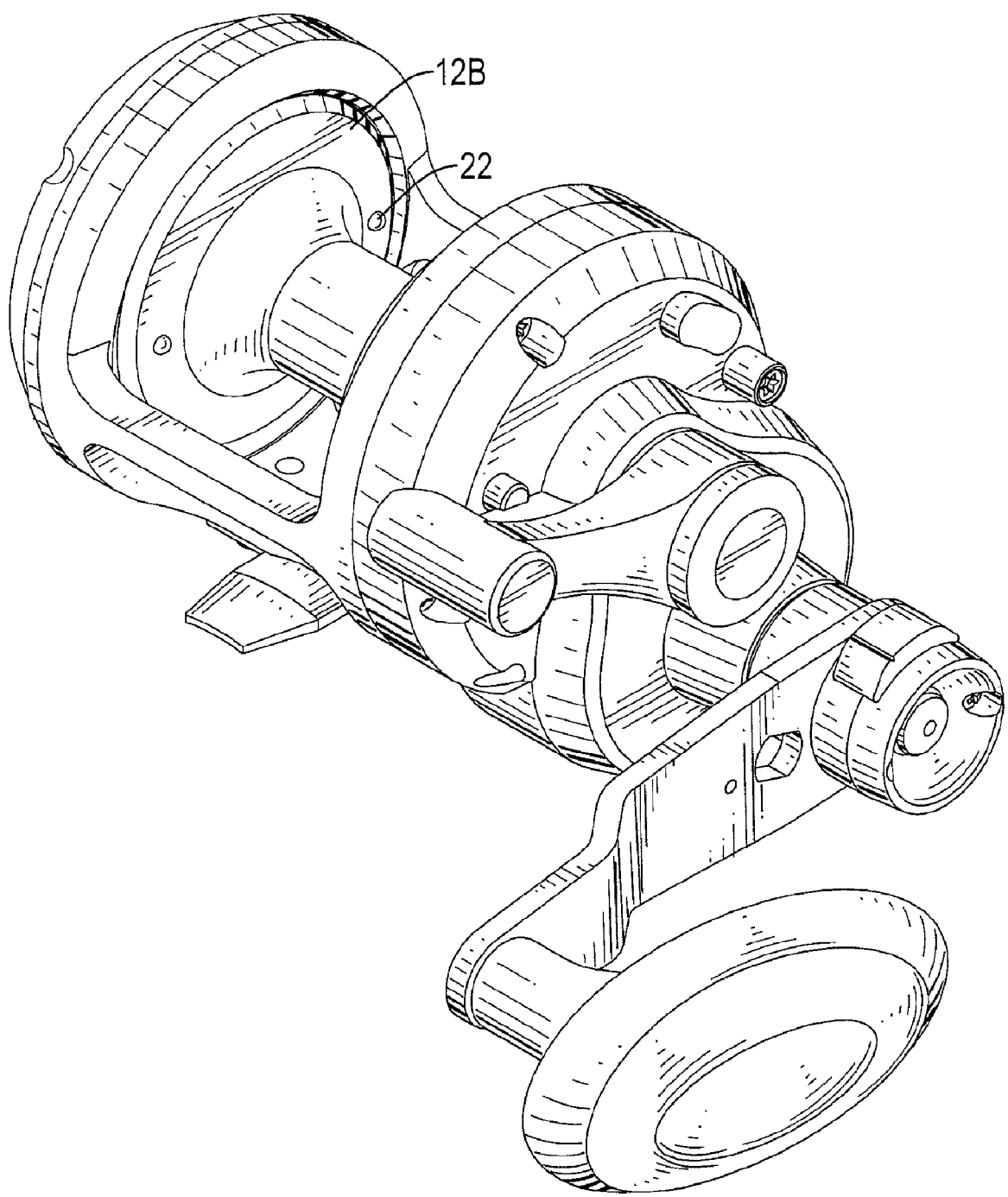
FIG. 6 is a perspective view of a third embodiment of a fishing reel with a warning device in accordance with the present invention.

Additionally, the warning device (20) can be applied to different kinds of fishing reel as shown in FIGS. 1, 5 and 6 and is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fishing reel comprising:
a body having a spool axle rotatably mounted in the body;
a spool rotatably and coaxially mounted around the spool axle of the body;
a handle rotatably mounted on the body and operatively connected to the spool; and
a warning device mounted between the spool and the spool axle and comprising
   at least one illuminating element mounted through the spool;
   an annular coil coaxially mounted in the spool and electrically connected to each illuminating element; and
   an annular permanent magnet coaxially mounted around the spool axle corresponding to the coil and being separated from the coil by a gap.

2. The fishing reel as claimed in claim 1, wherein each one of the at least one illuminating element is a light emitting diode (LED).

3. The fishing reel as claimed in claim 2, wherein the spool further has
   a center; and
   a recess defined around the center of the spool; and
   the annular coil is mounted in the recess.

4. The fishing reel as claimed in claim 1, wherein the spool further has
   a center; and
   a recess defined around the center of the spool; and
   the annular coil is mounted in the recess.

* * * * *